United States Patent [19]
Vornberger

[11] 3,854,250
[45] Dec. 17, 1974

[54] ROUGHING MACHINE HAVING COUNTERWEIGHTED ROUGHING TOOL

[75] Inventor: Walter Vornberger, Tewksbury, Mass.

[73] Assignee: International Shoe Machine Corporation, Nashua, N.H.

[22] Filed: Nov. 1, 1973

[21] Appl. No.: 411,608

[52] U.S. Cl. .................................. 51/99, 15/21 D
[51] Int. Cl. ........................... B24b 7/00, B24b 9/00
[58] Field of Search ............ 51/99, 47, 48, 68, 126, 51/147, 165.9; 15/21 C, 21 D, 77; 12/77, 1 R

[56] References Cited
UNITED STATES PATENTS

| | | | |
|---|---|---|---|
| 1,800,307 | 4/1931 | Marschke et al. | 51/99 |
| 2,982,056 | 5/1961 | Edgvist | 51/99 |
| 3,709,096 | 1/1973 | Stender-Roberts | 51/99 |

*Primary Examiner*—Othell M. Simpson
*Attorney, Agent, or Firm*—Albert Gordon

[57] ABSTRACT

A roughing machine having a roughing tool mounted to a tool head assembly that is pivoted to and extends forwardly of a sleeve. The tool head assembly is counterweighted by a counterweight assembly that is secured to the tool head assembly and extends rearwardly of the sleeve. An air operated motor interposed between the counterweight assembly and a housing located below the counterweight assembly is effective to raise and lower the assemblies to thereby apply a force to the assemblies to cause the roughing tool to apply a force to an upper margin that is to be roughed.

6 Claims, 4 Drawing Figures

PATENTED DEC 17 1974 3,854,250

ROUGHING MACHINE HAVING COUNTERWEIGHTED ROUGHING TOOL

BACKGROUND OF THE INVENTION

In pending application Ser. No. 392,850 filed Aug. 30, 1973 there is disclosed a roughing machine that includes a tool head assembly that extends forwardly of a pivot axis to which it is mounted for heightwise movement. A roughing tool, mounted to the tool head assembly, is effective to perform a roughing operation on a workpiece when the tool head assembly is forced downwardly into a lower working position and a motor is connected to the tool head assembly to move it between its lower working position and an upper idle position. With this arrangement, difficulties arise in precisely regulating the amount of downwardly directed force that is imparted to the tool head in its working position to thereby regulate the force applied by the roughing tool against the workpiece due to the fact that the downwardly directed force of the tool head is a function of the weight of the tool head assembly as well as a function of the force imparted to the tool head by the motor and the weight of the tool head assembly must be taken into account in operating the motor and in adjusting the force imparted to the tool head assembly by the motor.

The roughing machine functions to rough or abrade the margin of a shoe upper to render the upper receptive to cement that is used to bond the upper to an outsole. The amount of force applied by the roughing tool to the upper margin can be critical, especially with uppers made of synthetic or man made materials, as enough force must be applied to enable the roughing tool to be effective in its roughing operation and too much force can cause the roughing tool to shred the upper margin.

SUMMARY OF THE INVENTION

The problems discussed above are overcome, in accordance with this invention, by connecting a counterweight assembly to the tool head assembly that extends rearwardly of the pivot axis. The tool head assembly and the counterweight assembly are so constructed that they have opposed and approximately equal moments about the pivot axis. Therefore the weight of the tool head does not make a substantial contribution to the downwardly directed force imparted by the roughing tool against the upper margin and this downwardly directed force is proportional to the force imparted by a powered force applying mechanism to the assemblies in a direction to move the tool head assembly downwardly.

DESCRIPTION OF THE PREFERRED EMBODIMENT

Figure 1:
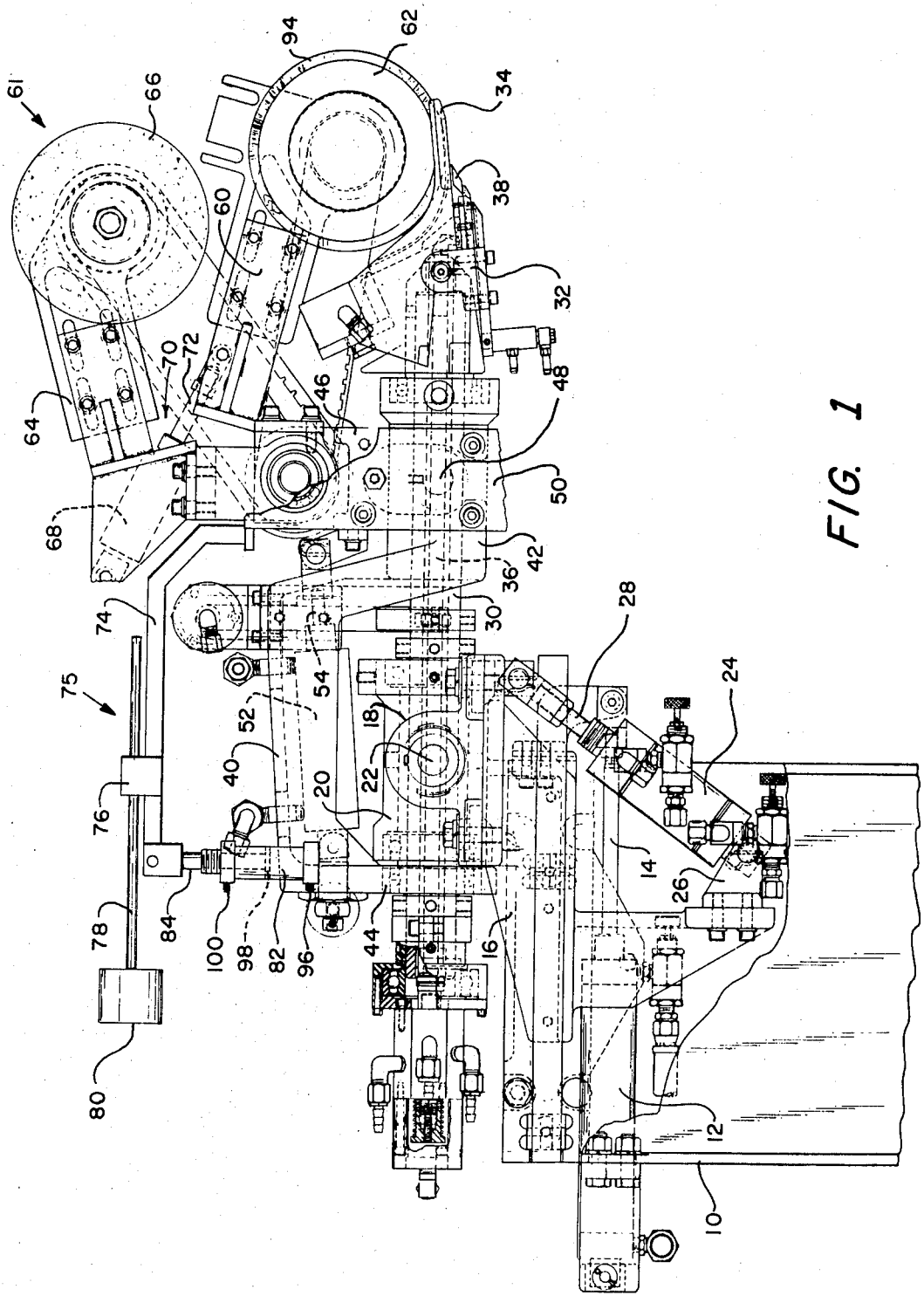
FIG. 1 is a side elevation of the roughing machine.

Directions extending left to right in FIG. 1 will be designated as "forward" and directions extending right to left in FIG. 1 will be designated as "rearward." The right end of the machine as seen in FIG. 1 is considered to be its front and the left end of the machine as seen in FIG. 1 is considered to be its back.

Referring to FIG. 1, the machine includes a frame 10 in which an hydraulically operated motor 12 is mounted. The piston rod 14 of the motor 12 is connected to a slide 16 that is mounted for forward-rearward movement in the frame 10. Trunnions 18 on the slide 16 pivotally mount a yoke 20 for heightwise swinging movement about the horizontal axis of spindles 22 that are rigid with the yoke 20 and that are rotatably mounted in the trunnions 18. Air operated motors 24 (only one of which is shown) are pivotally mounted on a bracket 26 on the slide 16 and have upwardly extending piston rods 28 that are pivotally connected to the yoke 20 to effect heightwise swinging movement of the yoke 20 about the axis of the spindles 22. A hollow shaft 30 extends forwardly and rearwardly through the yoke 20 and is so mounted in the yoke 20 that it is fixed against forward-rearward movement on yoke 20. A fork 32 having a pair of forwardly extending tines 34 (see also FIGS. 3 and 4) is mounted to the front of the shaft 30. A bar 36 is mounted within the shaft 30 for forward-rearward movement. A sensing finger 38 is mounted to the front of the bar 36 and is located below and between the fork tines 34 (see FIG. 4).

Figure 2:
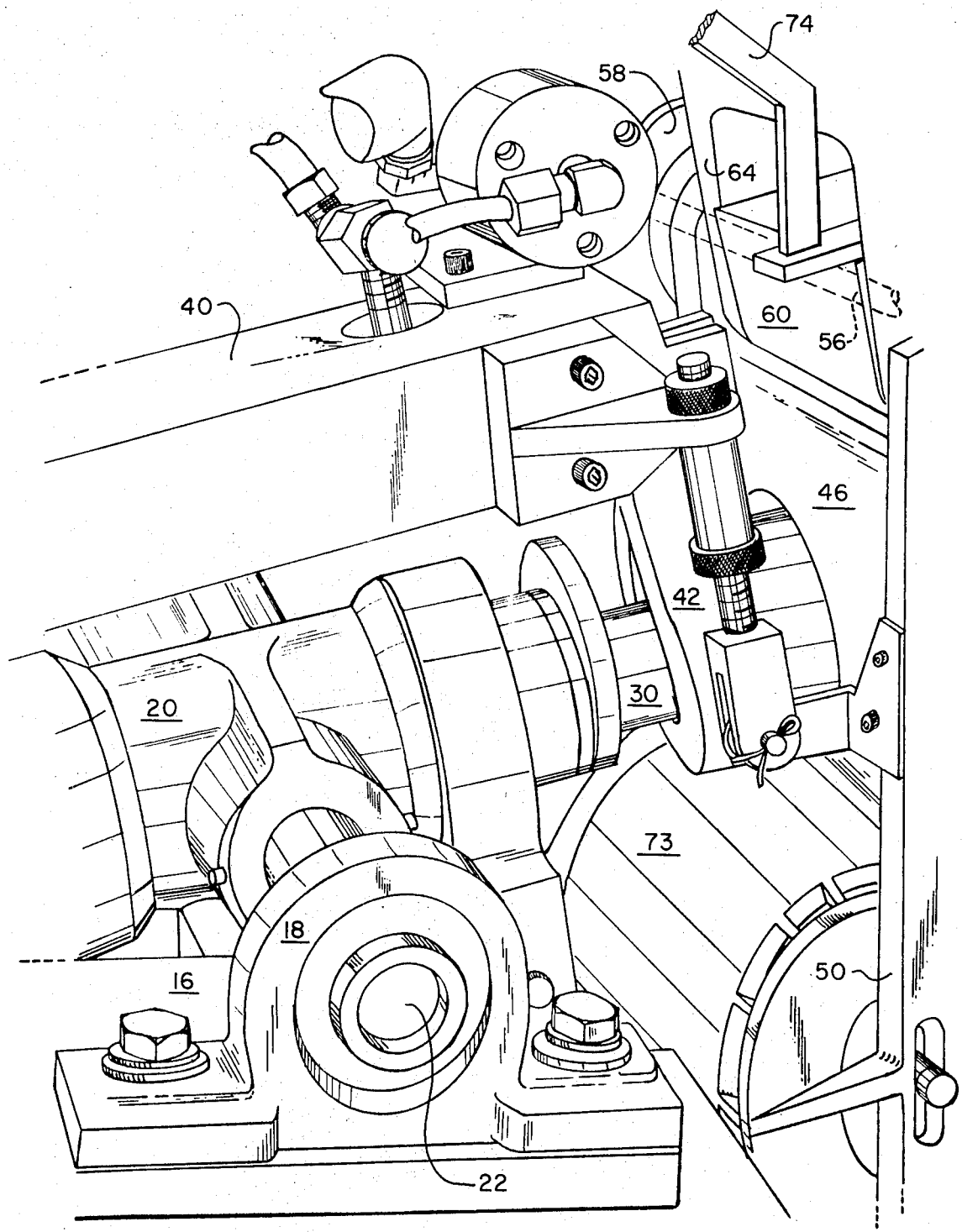
FIG. 2 is an isometric view of part of the roughing machine.

Referring to FIGS. 1 and 2, a housing 40 is mounted to the shaft 30 by means of a front trunnion 42 and a back trunnion 44, the trunnions being so mounted to the shaft as to be locked against forward-rearward movement on the shaft. A mounting member in the form of a yoke 46 is mounted, by pivot pins 48, to the front trunnion 42. A block 50 is rigidly mounted to the yoke 46. An hydraulically actuated motor 52, that is pivotally mounted to the housing 40, has a forwardly directed piston rod 54 that is pivoted to the yoke 46 to thereby position the yoke 46 in a desired forward-rearward position about the axis of the pins 48. A sleeve 56 extends between the block 50 on one side of the yoke 46 and a projection 58 on the other side of the yoke 46.

A rougher unit 60, forming a part of a tool head assembly 61, is pivotally mounted on the sleeve 56 for heightwise movement about the pivotal axis of the sleeve 56 and extends forwardly of this axis. A roughing tool, in the form of a wire brush 62, is so rotatably mounted to the front of the rougher unit 60 that the bottom of the brush periphery is located proximate to and between the fork tines 34 (see FIG. 4). A sharpener unit 64, forming another part of the tool head assembly, is also pivotally mounted on the sleeve 56 for heightwise movement and extends forwardly of the sleeve. A sharpening tool in the form of a grinding wheel 66 is so rotatably mounted to the front of the sharpener unit 64 that the bottom of the grinding wheel periphery is located above the top of the periphery of the brush 62. The cylinder of an air actuated motor 70 is pivotally mounted to the sharpener unit 64 and the piston rod 72 of the motor 70 is pivotally mounted to the rougher unit 60. The motor 70 serves to move the sharpener unit 64 towards and away from the rougher unit 60 between a position wherein the grinding wheel 66 is spaced from the periphery of the roughing brush 62 and a position wherein the grinding wheel 66 is in sharpening engagement with the roughing brush 62 as more fully disclosed in pending application Ser. No. 399,881 filed Sept. 24, 1973. An electric motor 73, rigidly mounted to the bar 50, is drivingly connected to the brush 62 and the grinding wheel 66 to rotate the brush 62 and the grinding wheel 66 by drive mechanisms that are disclosed in the aforementioned patent applications.

A bar 74 of a counterweight assembly 75 is so rigidly connected to the back of the rougher unit 60 that the bar 74, as well as the rest of the counterweight assembly, extends rearwardly of the sleeve 56 on which the tool assembly is pivotally mounted. The counterweight assembly 75 further comprises a bracket 76 secured to the bar 74 to which is adjustably secured a shaft 78 having a weight 80 at its front end. An air operated motor 82 is pivotally mounted to the housing 40. The upwardly directed piston rod 84 of the motor 82 is pivoted to the back of the bar 74.

The tool head aseembly 61 and the counterweight assembly 75 have such weights and weight distributions that they have opposed and approximately equal moments about the axis of the sleeve 56.

In the idle condition of the machine: the piston rod 14 is retracted into the motor 12 to place the slide 16, together with the tool head assembly 61, in a rearward position; the piston rods 28 are projected out of the motor 24 to place the tool head assembly 61 in an upper position; the motor 52 is maintaining the yoke 46, together with the tool head aseembly 61, in a desired position with respect to the front trunnion 42; the cylinder 68 is projected upwardly of the piston rod 72 to maintain the grinding wheel 66 in a relatively elevated position with respect to the brush 62 wherein the periphery of the grinding wheel is spaced from the periphery of the brush; the electric motor 73 is operative to rotate the brush 62 and the grinding wheel 66; and the piston rod 84 is retracted into the motor 82 to maintain the brush 62 in a relatively elevated position with respect to the fork tines 34.

Figure 3:
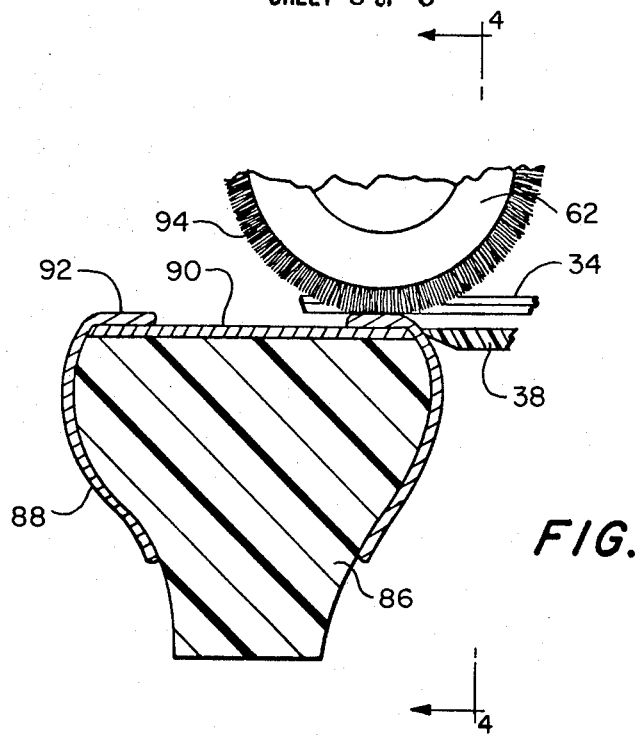
FIG. 3 is a view showing a shoe assembly in the process of having its upper margin roughed.
Figure 4:
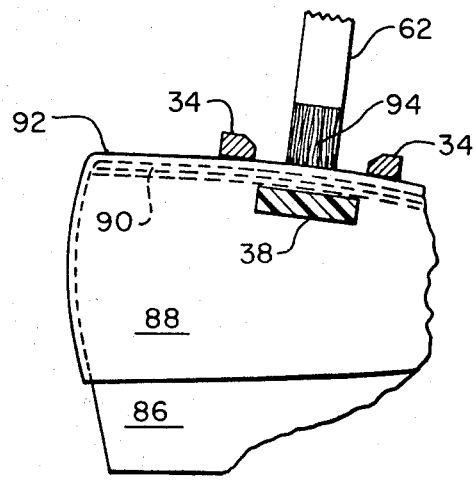
FIG. 4 is a view taken on the line 4—4 of FIG. 3.

FIGS. 3 and 4 show a shoe assembly that comprises a last 86 having an upper 88 mounted thereon and an insole 90 located on its bottom. The upper 88 has been lasted so that the upper margin 92 lies against and is secured to the insole and extends inwardly of the periphery of the insole and of the last bottom.

The shoe assembly is supported bottom-up on the shoe assembly support disclosed in the aforementioned application Ser. No. 392,850 and the machine is caused to go through a machine cycle as described in said application. At the beginning of the machine cycle, the motors 24 are actuated to lower the shaft 30 and the bar 36, together with the rougher unit 60, the fork tines 34 and the sensing finger 38. At the same time as motors 24 are so actuated, the motor 12 is actuated, by the mechanism shown in the aforementioned application Ser. No. 392,850 to project its piston rod 14 forwardly to move the shaft 30 and the bar 36, together with the rougher unit 60, the fork tines 34 and the sensing finger 38 forwardly. This lowering movement continues until the fork tines 34 engage a breast line portion region of the upper margin 92 and this forward movement continues until the sensing finger 38 engages the side of the shoe assembly as indicated in FIG. 3 and 4. In response to the engagement of the fork tines 34 with the upper margin 92, the motor 82 is so actuated as to raise the piston rod 84 under the force of pressurized air to thereby yieldably swing the tool head assembly 61, including the rougher unit 60, downwardly about the axis of the sleeve 56 until radially projecting bristles 94 on the brush 62 engage the upper margin 92 between the fork tines 34, as indicated in FIGS. 3 and 4, and the shoe assembly support is so operated as to move the entire upper margin 92 past the rotating brush 62 to thereby enable the brush bristles 94 to rough or abrade the upper margin. At the end of the machine cycle, the parts are returned to their idle positions with the tool head assembly 61, including the rougher unit 60, being raised to its idle position by the motors 24 and 82 to raise the brush 62 out of engagement with the shoe assembly and into its idle position. The shoe assembly, with its upper margin 92 roughed, is now released from the machine.

Due to the counterbalancing effect of the counterweight assembly 75 on the tool head assembly 61 caused by the opposite and approximately equal moments of these assemblies about the axis of the sleeve 56, the downward force of the brush bristles 94 against the upper margin 92 is, for all practical purposes, imparted solely by the upward force imparted to the piston rod 84 by air pressure in the motor 82 with substantially no contribution to the downward force of the brush bristles being made by the weight of the tool head assembly 61. When the motor 82 is actuated to raise the piston rod 84 to thus lower the rougher unit 60 about the axis of the sleeve 56 to lower the brush bristles 94 against the upper margin 92, pressurized air enters the motor 82 through a nipple 96 at the bottom of the motor 82 and below the piston 98 of the motor 82 and the air in the motor 82 above the piston 98 is vented through a nipple 100. Therefore, the downwardly directed force of the brush bristles 94 is proportional to the pressure of the air entering the motor 82 through the nipple 96, and this pressure is adjustable by a conventional pressure regulator. The pressure is adjusted by the pressure regulator, so that the brush bristles 94 will abrade or rough the upper margin 92 to the extent necessary to render the upper margin receptive of cement that is later used to adhere the upper to an outsole. With certain types of upper materials, particularly with uppers made of synthetic or man made materials, this pressure is critical as the application of too much force by the bristles 94 against the material tends to shred the material.

1. A roughing machine comprising: a mounting member; a tool head assembly pivotally mounted to the mounting member for heightwise movement about a pivot axis and extending forwardly of the axis; a roughing tool mounted to the tool head assembly; a counterweight assembly connected to the tool head assembly and extending rearwardly of said axis; said assemblies being so constructed and arranged that they have opposed and approximately equal moments about said axis; and powered adjustable force applying means connected to one of the assemblies effective to impart heightwise movement to the assemblies including an adjustable downward force to the tool head assembly whereby the powered means may effect a downward movement of the tool head assembly to cause the roughing tool to engage and rough a workpiece with a force that is proportional to the force imparted to the assemblies by the powered means.

2. The machine of claim 1 wherein said powered means comprises an air actuated motor so constructed as to impart said force to the assembly by air under pressure.

3. The machine of claim 1 further comprising: a yoke which constitutes said mounting member; a sleeve on said yoke on which the tool head assembly is mounted, the axis of the sleeve constituting said pivot axis; and a housing located rearwardly of said sleeve below the counterweight assembly; and wherein said powered means is interposed between the housing and the counterweight assembly.

4. The machine of claim 3 wherein said powered means comprises an air actuated motor so constructed as to impart said force to the assembly by air under pressure.

5. A roughing machine comprising: a yoke; a sleeve on said yoke whose axis constitutes a pivot axis; a tool head assembly pivotally mounted on the sleeve for heightwise movement about said pivot axis and extending forwardly of the axis; a roughing tool mounted to the tool head assembly; a counterweight assembly connected to the tool head assembly and extending rearwardly of said axis; said assemblies being so constructed and arranged that they have opposed and approximately equal moments about said axis; a housing located rearwardly of said sleeve below the counterweight assembly; and powered means interposed between and connected to the housing and the counterweight assembly effective to impart heightwise movement to the assemblies whereby the powered means may effect a downward movement of the tool head assembly to cause the roughing tool to engage and rough a workpiece with a force that is proportional to the force imparted to the assemblies by the powered means.

6. The machine of claim 5 wherein said powered means comprises an air actuated motor so constructed as to impart said force to the assembly by air under pressure.

* * * * *